Sept. 7, 1965  W. E. BRADLEY  3,205,303
REMOTELY CONTROLLED REMOTE VIEWING SYSTEM
Filed March 27, 1961  6 Sheets-Sheet 1

INVENTOR.
WILLIAM E. BRADLEY
BY Robert D. Sanborn
ATTORNEY Sept. 7, 1965   W. E. BRADLEY   3,205,303
REMOTELY CONTROLLED REMOTE VIEWING SYSTEM
Filed March 27, 1961   6 Sheets-Sheet 4

INVENTOR.
WILLIAM E. BRADLEY
BY
Robert D. Sanborn
ATTORNEY

FIG. 15.

INVENTOR.
WILLIAM E. BRADLEY
BY Robert D. Sanborn
ATTORNEY

United States Patent Office 3,205,303
Patented Sept. 7, 1965

3,205,303
REMOTELY CONTROLLED REMOTE VIEWING
SYSTEM
William E. Bradley, Washington, D.C., assignor, by mesne assignments, to Philco Corporation, Philadelphia, Pa., a corporation of Delaware
Filed Mar. 27, 1961, Ser. No. 98,636
3 Claims. (Cl. 178—6.8)

The present invention relates to remote viewing systems and more particularly to remotely controlled remote viewing systems.

Systems have been proposed for remotely viewing a scene by means of a closed-circuit television system or the like. Some of these prior art systems have included means for remotely controlling the remote pickup in one or more directions thereby to produce some change in the scene presented at the remote location. Attempts have been made in the past to coordinate the movement or control of the remote pickup with the movement of the remote observer's eyes or head in order to inject an element of realism into the remote presentation. These systems of the prior art have the disadvantage that the movement of the observer is unduly restricted, the field of view at the remote location is severely limited, the method of control is unduly complex and/or the nature of the display on the indicator is such that the observer lacks the subjective feeling of being present at the remote pickup. These and other disadvantages of prior art systems have made them inapplicable to such complex tasks as landing a high-speed aircraft either from a point within the plane or at some remote location on the ground, controlling a highly maneuverable submarine, traffic surveillance, etc.

It is an object of the present invention to provide a remote controlled remote viewing system which is readily controllable by the observer.

It is a further object of the present invention to provide a remote controlled remote viewing system which is controlled primarily by unrestrained movements of the observer's head.

Still another object of the present invention is to provide a remote controlled viewing system which is limited in its field of view only by the natural range of movement of the observer's head.

An additional object of the present invention is to provide a remote controlled remote viewing system which accurately simulates the scene as it would be observed by the observer if present at the remote pickup location.

A further object of the present invention is to provide a remote controlled remote viewing system having one or more indicators having presentations controlled by more than one observer.

An additional object is to provide a remote controlled remote viewing system having a main indicator controlled by a principal observer and an auxiliary indicator controlled jointly by the principal observer and an associate observer.

Still another object of the invention is to provide a light weight indicator system for airborne use which makes optimal use of very small cathode ray tubes and which has a low power consumption.

A further object of the invention is to provide a light weight indicator system which is readily adaptable to field sequential color television and field sequential stereoscopic presentation.

In general these and other objects of the present invention are achieved by providing an indicator which is maintained in a fixed position with respect to the observer's head without restricting the natural movements of the observer's head. Position sensing means which are maintained in predetermined positions with respect to the observer's head are employed to control the position of a remote pickup, the remote pickup being free to follow all angular movements of the observer's head. The remote pickup supplies a video signal to the indicator which causes the indicator to display the scene viewed by the pickup. Auxiliary pickups for viewing instruments or other data revealing devices may be matrixed with a remote pickup so that a composite display appears on the indicator. The scene televised by each pickup may be presented in a distinctive color if desired in order to avoid confusion on the indicator. An auxiliary indicator may be employed for an associate observer. Means similar to those described above may be employed for maintaining the auxiliary indicator in a fixed position with respect to the associate observer's head. Sensing means may be employed to determine the difference in the angular orientation of the principal observer's head and the auxiliary observer's head. The display on the auxiliary indicator may be displaced by an amount proportional to the angular displacement between the heads of the two observers so that the scene on the auxiliary indicator is centered only when the two observers have their heads oriented in the same direction.

For a better understanding of the present invention together with other and further objects thereof, reference should now be made to the following detailed description which is to be read in conjunction with the accompanying drawings in which:

FIG. 14 is a diagram which explains the cooperation of the headpiece of FIG. 13 with the reference fields established by the structure of FIG. 12;

Figure 1:
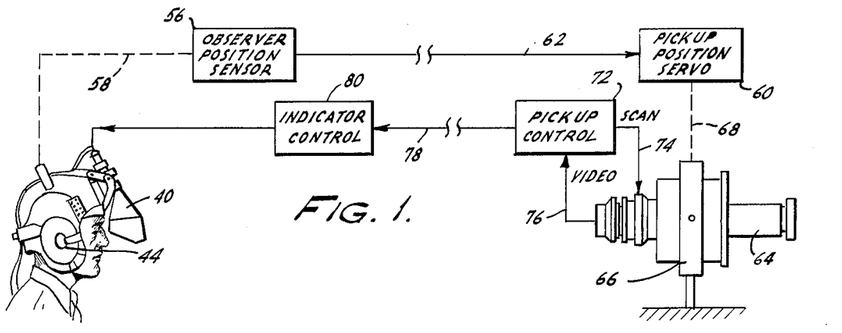
FIG. 1 is a diagram partially in block form showing the overall organization of a preferred embodiment of the present invention.
Figures 1A, 2, 3:
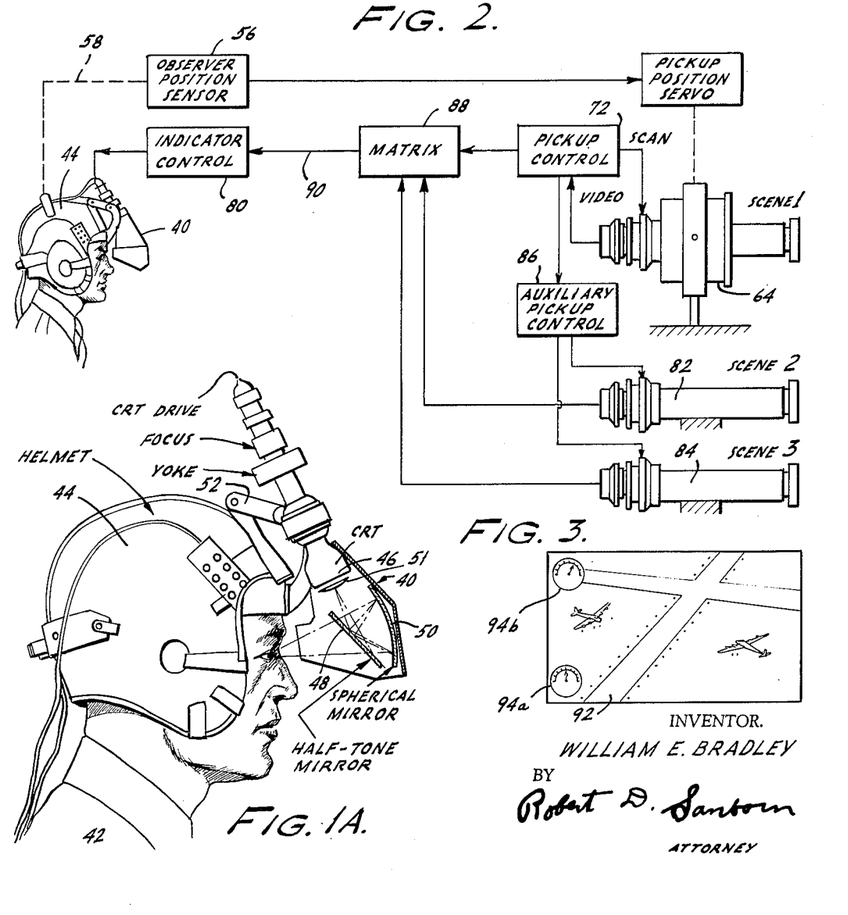
FIG. 1A is a detailed view of the helmet and viewer assembly of FIG. 1.
FIG. 2 is a diagram partially in block form of a second preferred embodiment of the invention employing a remotely controlled remote pickup in conjunction with two auxiliary pickups.
FIG. 3 is a view showing the scene as presented on the indicator of the systems of FIG. 2.

The remote viewing system shown in FIG. 1 comprises a lightweight indicator system 40 which is adapted to be supported on the head of an observed. In the embodiment of FIG. 1 indicator 40 is supported on the head of the observer by attaching the indicator system 40 to a helmet or headpiece 44. FIG. 1A shows in more detail the relationship between the indicator 40 and the eyes of the observer. As shown in FIG. 1A a cathode-ray tube 46 is mounted so that it projects an image onto a half-tone or half-silvered mirror 48. The image is reflected by mirror 48 onto a spherical mirror 50. Light is reflected from mirror 50 through the half-tone mirror 48 to the eye of the observer. A field lens 51 is provided adjacent the face of the cathode-ray tube 46 so that the scene on the face of the cathode-ray tube is presented in the same aspect to both eyes. The observer sees what appears to be an enlarged, virtual image of the scene portrayed on the screen of the cathode-ray tube 46. The cathode-ray tube 46 is provided with the usual focusing and deflection circuits which will not be described in detail. An adjustable bracket 52 is provided for mounting the indicator system 40 to helmet 44. This permits the virtual image produced by the optical system of indicator assembly 40 to be placed directly in front of the eyes of the observer.

It is to be understood that in practice it may be preferable to replace the optical system shown with a wide angle binocular optical system with separate eyepieces for each eye. An optical system similar to the optical system employed in a binocular microscope may be employed, for example. With such an optical system the operator may be presented with a wide field of view, for example 60 degrees or more.

Means are provided in the system of FIG. 1 for sensing the angular position of the head of the observer. This means is schematically illustrated in FIG. 1 by the block 56. The coupling between unit 56 and helmet 44 which may be electrical, magnetic, optical or mechanical, etc. is schematically represented by the broken line 58. Preferred forms of observer position sensors are shown in detail in FIGS. 4–6 and 12–14.

The observer position sensor 56 is coupled to a pickup position servo 60 by a transmission link 62. Transmission link 62 may employ mechanical, electrical, hydraulic or other suitable form of coupling between the observer position sensor 56 and the pickup position servo 60. The coupling between these two elements may be either direct coupling by way of suitable direct links or cables or indirect coupling by way of a radio link or the like.

Pickup position servo 60 is mechanically coupled to an adjustably mounted remote pickup 64. Preferably remote pickup 64 comprises a television camera or similar electro-optical transducing device. The adjustable mounting for pickup 64 is schematically illustrated by the gimbals 66. The mechanical coupling between servo 66 and pickup 64 is schematically represented by the broken line 68.

Pickup 64 is provided with suitable electrical potentials and scanning signals by a pickup control circuit 72. The multiple connections required between pickup control circuituit 72 and pickup 64 are schematically represented by the single arrow 74. The pickup 64 supplies a video signal to pickup control 72 by way of connection 76. The video signal thus supplied and any necessary synchronization data are transmitted to an indicator control 80 by way of transmission link 78. Again transmission link 78 may be either a direct coupling by way of cable or the like or it may be an indirect coupling employing a radio link or the like. Indicator control 80 contains the necessary circuits for converting the video signal and synchronizing data supplied by link 78 to an image on the screen of cathode-ray tube 46 of the scene viewed by camera 64. Indicator control 80 also supplies the necessary bias, blanking, and sweep signals to indicator 40.

In the remote viewing system shown in FIG. 1 the coupling between helmet 44 and pickup 64 by way of observer position sensor 56 and pickup position servo 60 is such that pickup 64 follows all of the angular movements of the head of the observer. In general this will require angular movement of the pickup 64 in three mutually perpendicular planes since the observer may nod his head from front to back, tilt his head from side to side or turn his head about a vertical axis. If pickup 64 is arranged to follow the motions of the observer's head, it will be seen that the scene presented on the screen of the indicator 46 and viewed through the optical system 48–50 will always appear directly in front of the observer's eyes and will change as he moves his head. This will impart a feeling of realism. By way of example, in an airborne system the observer with the indicator 40 may be located at some position well within an airplane where his view is obstructed by wings, fuselage or the like. The pickup 64 may be mounted in any suitable place on the airplane, for example at the nose. Alternatively, two or more pickups located at strategic places on the airplane may be coupled to indicator 40 in such a manner that only the pickup having an unobstructed view supplies a signal to indicator 40. Thus unobtructed view in all directions from the airplane is possible.

In an alternative arrangement, the pickup 64 may be located in an airplane at the position normally occupied by the pilot's head. An observer on the ground may be provided with suitable remote controls for the airplane and a viewer 40 which is coupled to the pickup 64 by way of suitable radio links. Thus in remotely controlling the aircraft from the ground the observer will see exactly what he would see if located in the cockpit of the airplane. Other uses for a remote observation system of the type shown in FIG. 1 are conning a ship or submarine, directing a tank or the like.

FIG. 2 shows a remote viewing system similar to the one shown in FIG. 1 but with the addition of two fixed auxiliary pickups 82 and 84. Necessary bias, blanking and scan signals are supplied to auxiliary pickups 82 and 84 by auxiliary pickup control 86. Again the circuits represented by block 86 may be the conventional bias, blanking and scan circuits associated with conventional television camera pickup tubes. Auxiliary pickup control 86 is preferably coupled to pickup control 72 to provide synchronization of the scans on all three pickups 64, 82 and 84. The video signals from auxiliary pickups 82 and 84 are supplied to a matrix circuit 88 which combines the video output signals of pickups 82 and 84 with the video signal and other remote image information received from pickup control 72. Matrix circuit 88 may cause the images derived from the signals supplied by pickups 82 and 84 to be superimposed on the image derived from the signals supplied by movable pickup 64. Circuits for thus matrixing the outputs of two or more telexision cameras are in commercial use at the present time. Therefore it is believed that no detailed explanation of matrix circuit 88 is required. Matrix circuit 88 is coupled to indicator control 80 by way of a transmission link 90 which corresponds to the transmission link 78 of FIG. 1.

Auxiliary pickups 82 and 84 may be directed at suitable instruments or indicating devices on the controlled vehicle or machine or one or more of these pickup devices may be oriented in fixed direction with respect to the vehicle so as to provide a reference view of the surrounding terrain.

FIG. 3 is a pictorial representation of what might appear on the screen of indicator tube 46 if the system of FIG. 2 were located on an aircraft which is approaching an airfield. The general scene of the runways 92 and other features of the ground may be provided by movable pickup 64. This ground scene will change as the observer moves his head. Superimposed on this ground scene at fixed positions are views of certain of the aircraft control instruments represented schematically at 94$^a$ and 94$^b$. It will be seen that the display provided in FIG. 3 is even more convenient than that provided an airplane pilot who is viewing the ground directly since, in the system of FIG. 2, it is not necessary for the pilot or observer to shift his eyes from the main scene to check the reading of the instruments.

One form of electromechanical observer position sensor is shown in more detail in FIGS. 4 through 7. The observer position sensor shown in FIG. 4 comprises two tracks 100 and 102 which may be secured to any suitable supporting structure (not shown in FIG. 4). A carriage 104 is journaled in slides 100 and 102 so that it is free to move parallel to the slides. Carriage 104 is provided with a cross carriage 106 which is free to move in a direction at right angles to slides 100 and 102. A shaft 108 passes through the cross carriage 106. Preferably shaft 108 is keyed so that it does not rotate with respect to cross carriage 106 but is otherwise free to slide in an axial direction through cross carriage 106. A spring 110 is encompassed between cross carriage 106 and a collar 112 which is securely affixed to shaft 108. Spring 110 is so constructed that it urges shaft 108 in an upward direction. As will be explained in more detail presently, spring 110 acts as a counter-balance for apparatus suspended from shaft 108.

Figures 4, 5, 6, 7:
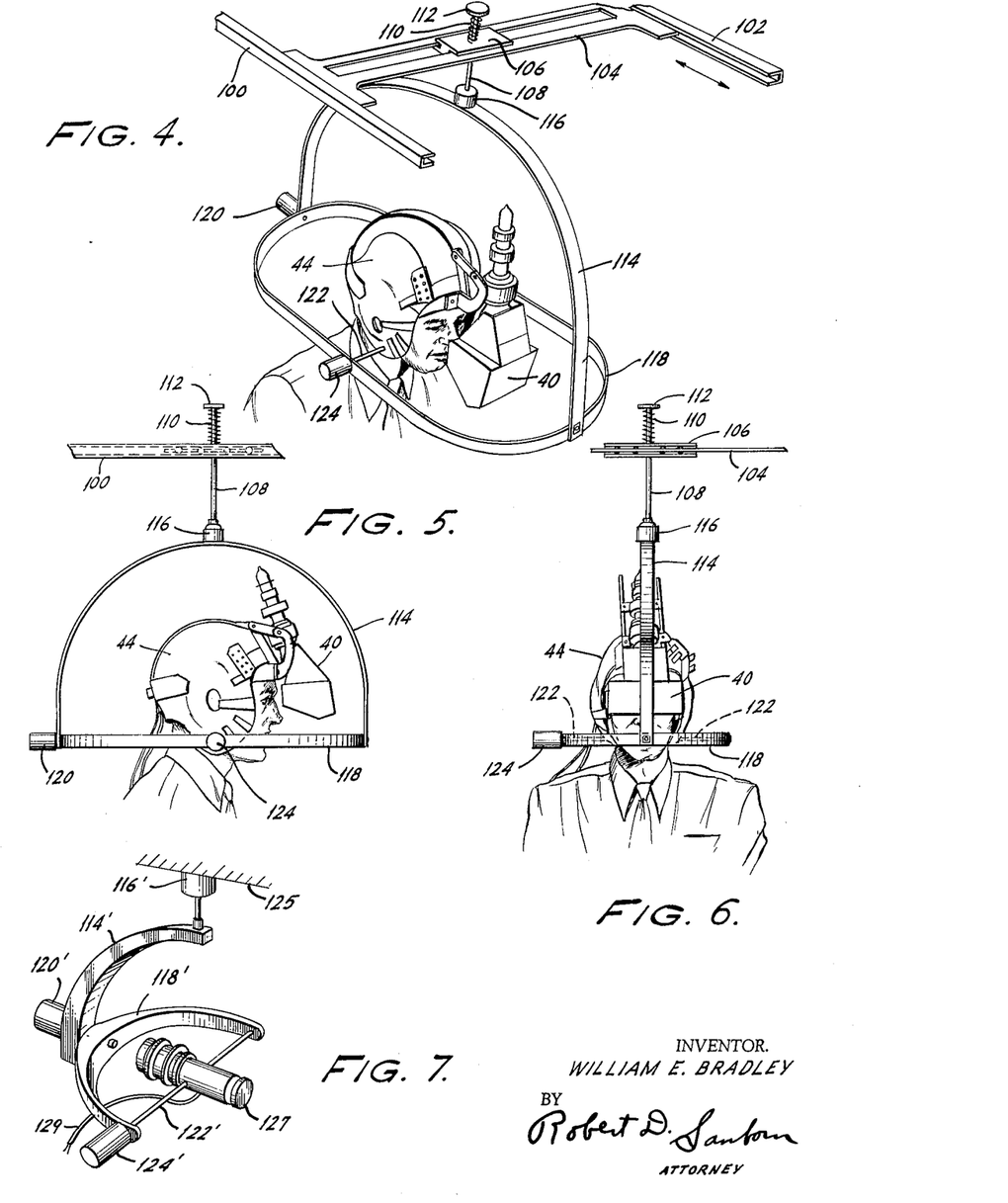
FIG. 4 is perspective view of an electromechanical position sensing apparatus which may be employed in any of the systems of FIGS. 1 through 3.
FIGS. 5 and 6 are fragmentary views which illustrate in more detail the electromechanical position sensing apparatus of FIG. 4.
FIG. 7 is a perspective view of a simple remote pickup control system which may be employed with the systems of FIGS. 1 and 2.

From the foregoing description, it will be seen that shaft 108 is free to move in three mutually perpendicular linear directions with respect to the supporting structure to which slides 100 and 102 are attached. However any angular movement of shaft 108 is prevented by cross carriage 6, carriage 104 and slides 100 and 102.

A half ring 114 which forms a portion of a gimbal support for helmet 44 is rotatably coupled to shaft 108 by way of angle-sensing means 116. Sensing means 116 may be a potentiometer, a synchro-transmitter or any other known form of angle-sensing means. A ring 118 is pivotally mounted on half ring 114 to rotate about an axis perpendicular to shaft 108. A second angle-sensing means 120 is coupled to half ring 114 and ring 118 so as to measure the angular displacement of ring 118 with respect to half ring 114.

Helmet 44 is pivotally mounted to ring 118 by means of supporting rods 122. A third angular sensing means 124 is mechanically coupled to one of the rods 122 and ring 118 so that the angular displacement of helmet 44 about the axis of rods 122 with respect to ring 118 may be measured. It will be seen that, with the supporting arrangement shown in FIGS. 4 through 6, helmet 44 is free to assume any position within a volume of space which is limited only by the length of tracks 100, 102, the distance which cross carriage 106 may move on carriage 104 and the length of rod 108.

FIG. 7 illustrates one simple form of remote pickup assembly which may be employed with the observer position sensor shown in FIGS. 4–6. This remote pickup assembly comprises a gimbal ring sector 114' which is supported on the shaft of a remote receiver 116'. Remote receiver unit 116' is secured to a support schematically illustrated at 125. A U-shaped gimbal sector 118' is pivotally mounted to sector 114'. A second remote receiver 120' controls the angular position of the sector 118' with respect to the yoke 114' of the gimbals. A suitable image pickup device such as television camera tube 127 may be supported on shaft 122' so as to rotate therewith. A third remote receiver 124' controls the angular position of shaft 122' with respect to yoke 118'. A flexible cable 129 is provided for supplying scanning signals to and receiving video signals from television camera tube 127. If the angular sensing means 116, 120 and 124 of FIGS. 4–6 are synchro transmitters and the remote receivers 116', 120' and 124' of FIG. 7 are synchro receivers each angular sensing means may be connected directly to the remote receiver to form conventional synchro transmitter-receiver pairs.

Figure 8:
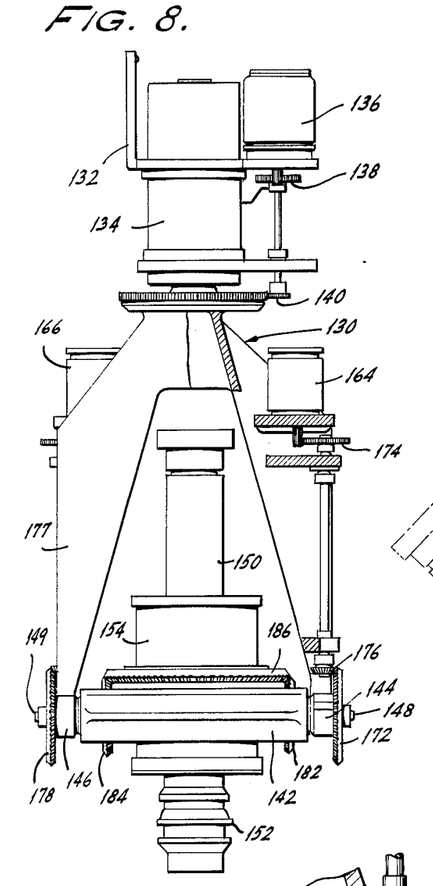
FIGS. 8 and 9 are front and side views, respectively, partially in section, of a preferred form of remote pickup device and positioning means which may be employed in the embodiments of FIGS. 1 and 2.

While the pickup assembly shown in FIG. 7 is suitable for low cost, low precision systems on non-movable structures, a more rugged, higher precision system is usually required for moving vehicles and the like. One preferred form of remote pickup assembly is shown in detail in FIGS. 8 through 11. In FIG. 8 a bifurcated yoke 130 is rotatably mounted in a bracket 132 by means of bearing assembly 134. Yoke 130 and bracket 132 may be so positioned that the axis of bearing assembly 134 is vertical. Yoke 130 is rotated about the axis of bearing assembly 134 by motor 136 through the gear trains 138 and 140. Shafts 148 and 149 are journaled in the lower ends 144 and 146 of bifurcated yoke 130 to provide support for an annular ring 142. Ring 142 is free to rotate about a diameter, the axis of rotation being perpendicular to the axis of rotation of yoke 130 in bearing 134.

Figure 9:
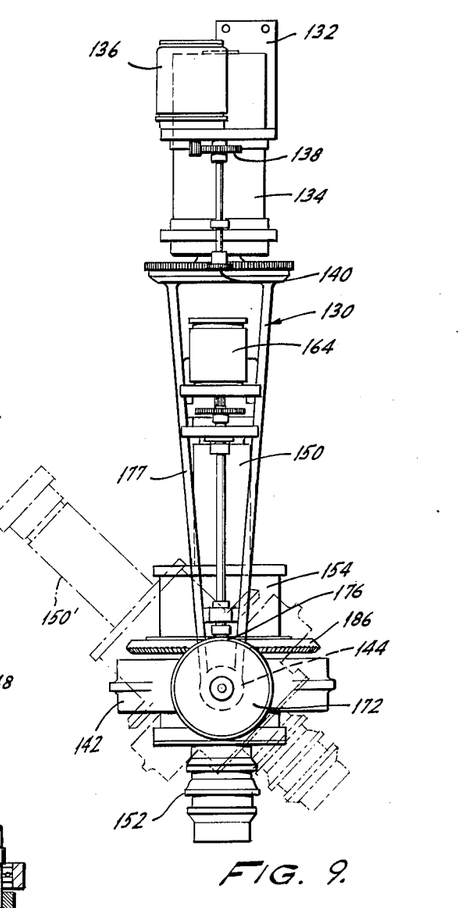
Figure 10:
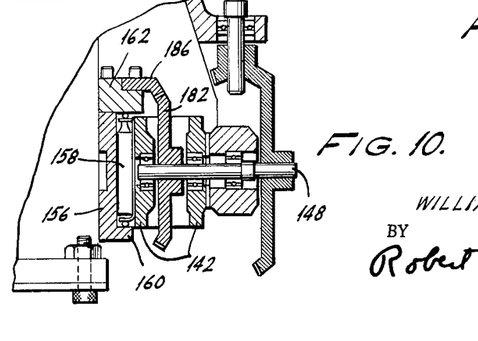
FIGS. 10 and 11 are detailed fragmentary views of portions of the remote pickup mount shown in FIGS. 8 and 9.

A television camera tube 150 together with lens 152 and deflection and focusing coils 154 are supported on an inner ring 156 which is most clearly shown in FIG. 10. In FIG. 8 camera tube 150 is shown aligned with the axis of bearing 134. This is a position the camera tube would assume if the observer were looking straight down. The phantom view 150' in FIG. 9 shows the position the camera tube 150 would assume if the observer were looking down at an angle of approximately 45°. A bearing 158 is provided between inner ring 156 and outer ring 142. Axial movement of inner ring 156 with respect to the outer ring 142 is prevented by flanges 160 and 162 which are formed integrally with or securely fastened to the inner ring 156.

The pickup assembly shown in FIGS. 8 through 10 employs two motors 164 and 166 which operate jointly to rotate ring 142 about the axis of shafts 148 and 149 and/or to rotate inner ring 156 within outer ring 142. Motor 164 drives a bevel gear 172, which is keyed to shaft 148, through gear train 174 and bevel gear 176. A stiffening flange on the right side of yoke 130 which corresponds to the stiffening flange 177 has been broken away in order to show gears 174 and 176.

Figures 11, 14B:
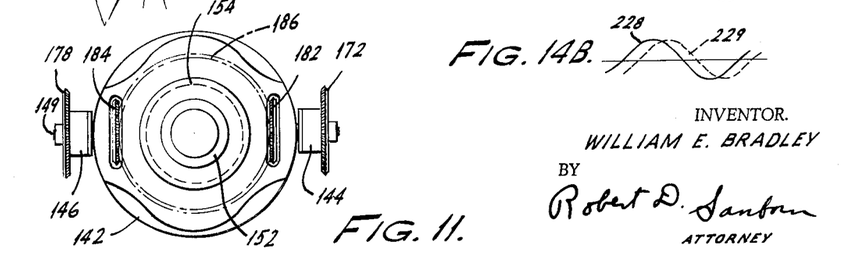

Motor 166 drives a similar bevel gear 178 which is affixed to shaft 149 by way of gear trains (not shown) which are similar to gear trains 174 and 176. A bevel gear 182 is fastened to shaft 148 and a corresponding bevel gear 184 is fastened to shaft 149. As shown in FIG. 11, which is a view of the structure of FIG. 1 as seen from below, gears 182 and 184 rotate in openings formed in outer ring 142. The two gears 182 and 184 mesh with a bevel ring gear 186 which completely encircles the camera tube 150 and which is rigidly fastened to inner ring 156 by way of flange 162.

It will be seen that if motors 164 and 166 rotate in the same direction, gears 182 and 184 will tend to rotate ring gear 186 in opposite directions. Since this is impossible, there will be no relative rotation of gears 182 184 with respect to the common gear 186. Instead the whole assembly, including inner ring 156 and outer ring 142 and camera tube 150, will rotate about the axes of shafts 148 and 149. If motors 164 and 166 rotate in opposite directions at equal speed, the two gears 182 and 184 will tend to rotate ring gear 186 in the same direction. Therefore the inner ring 156 will rotate within the outer ring 142. No rotation of inner ring 142 about the axes of shafts 148 and 149 is possible unless there is a difference in the speed of gears 182 and 184. If the two motors 164 and 166 are rotating at different speeds, the relative rotations can be resolved into two components, one component representing motors 164 and 166 rotating at the same speed in the same direction and the other component representing motors 164 and 166 rotating at the same speed but in opposite directions. As explained above, one component will tend to rotate ring 142 about the axes of shafts 148 and 149 and the other component will tend to rotate ring 156 within ring 142. These two relative rotations can occur simultaneously.

It can be shown that if ring 142 is rotated 90° from the position shown in FIG. 8 so that inner ring 156 rotates about an axis which is perpendicular to the plane of the drawing, the structure shown in FIG. 8 is equivalent to a full gimbal mounting for the camera tube 150.

The pickup assembly shown in FIGS. 8 through 10 has three degrees of angular freedom and therefore is free to reproduce any angular motions sensed by the observer motion sensor assembly shown in FIGS. 4 through 7. The angle seensing means 116, 120 and 124 may be connected to the three motors of the pickup assembly of FIGS. 8–11. Angle sensing means 120 and 124 may be matrixed to the motors 164 and 166 in a manner similar to the one shown in FIG. 15. If a closed loop servo is desired, suitable position sensing means may be secured to the camera tube 150 for feeding a signal back to the pickup position servo 60.

Figures 12, 13, 14A:
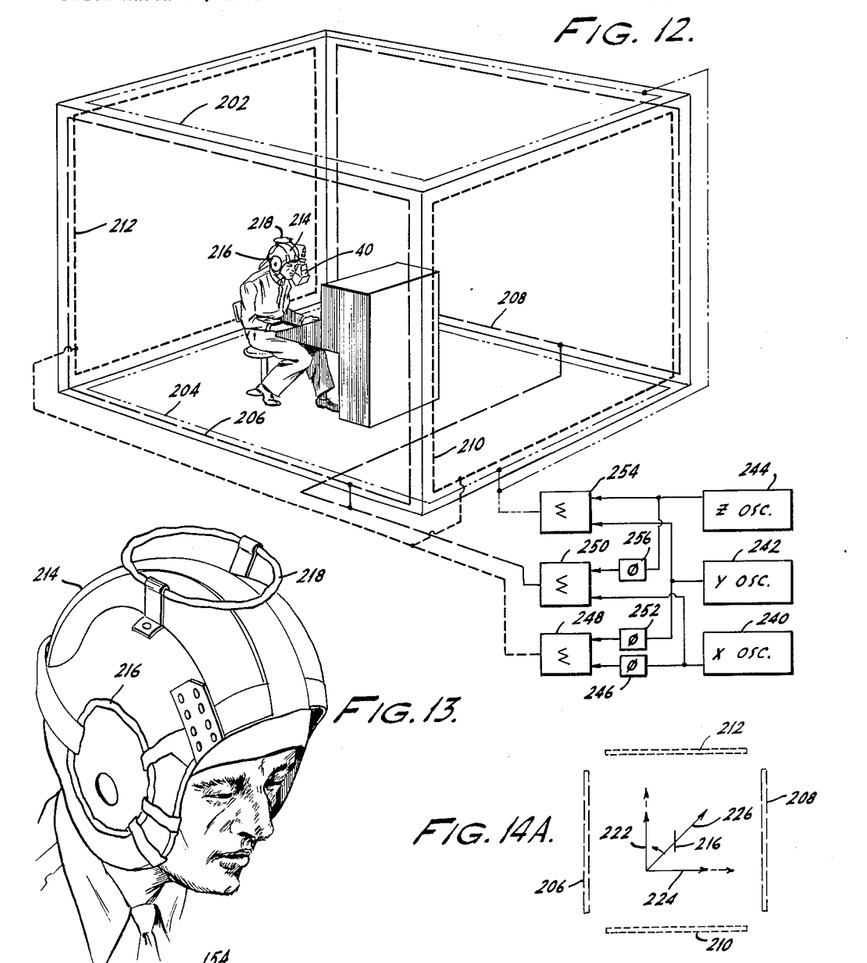
FIG. 12 is a perspective view of a preferred apparatus for establishing an appropriate frame of reference for an electronic observer position sensing system.
FIG. 13 is a view showing the location of sensing coils on the observer's headpiece.

An electromagnetic form of observer position sensing system is illustrated in FIGS. 12 through 14. In the position sensing in the system shown by FIGS. 12 through 14 there are no mechanical connections between the observer's helmet and the reference structure. Thus the system of FIGS. 12 through 14 provides fewer restrictions on the movement of the observer than the system of FIGS. 4–7.

As shown in FIG. 12, the space in which the observer is stationed is provided with three pairs of induction coils. Coils 202 and 204 form one pair. Coil 204 is located adjacent the floor and coil 202 is in a plane parallel to the floor and well above the head of the observer. Coils 206 and 208, which form the second pair, are located at the right and left boundaries of the space occupied by the observer. Coils 210 and 212 form the third pair and are located at the front and rear boundaries of the observer space. The observer is provided with a helmet 214 on which are mounted two sensing coils 216 and 218 which are shown in greater detail in FIG. 13. The indicator 40 is not shown in FIG. 13 in order not to obstruct the view of coil 218. Coils 218 and 216 are preferably disposed in mutually perpendicular planes. The orientation of these coils with respect to helmet 214 is not critical. However, in the following description it will be assumed that coil 218 is in a horizontal plane, parallel to coils 202 and 204 when the observer is sittting with his head erect and looking straight forward. Similarly it will be assumed that coil 216 is parallel to the plane of coils 206 and 208 with the observer's head in the same position.

Three oscillators 240, 242 and 244 provide signals at three appropriate frequencies, for example, 85 k.c., 100 k.c. and 121 k.c., respectively, for energizing the three coil pairs. The three frequencies mentioned provide a minimum of beat interference with the magnetic sweep signals which must be supplied to the observer's indicator tube. For convenience, these three oscillators, will be referred to hereinafter as the X, Y and Z oscillators, respectively, since as will be shown presently they are connected to the coil pairs so as to set up rotating fields in three mutually perpendicular planes. The signal from oscillator 240 is supplied through a 90° phase shifter 246 to a linear adder network 248. The signal from oscillator 240 is also supplied directly to one input of a second linear adder network 250. The output of adders 248 and 250 are connected to coil pairs 210–212 and 206–208, respectively. The quadrature phased fields set up by coil pairs 206–208 and 210–212 will produce a magnetic field vector which rotates in a horizontal plane at the frequency of the signal supplied by oscillator 240. This field will be referred to as the X field. The output of oscillator 242 is connected to a second input of adder 248 through a 90° phase shifter 252 and directly to one input of a third linear adder network 254. The output of adder network 254 is connected to coil pair 202–204. As a result, a magnetic vector rotates in a plane parallel to the plane of coils 206 and 208 at the frequency of the signal supplied by oscillator 242. For convenience, this field will be referred to as the Y field. Similarly the output of oscillator 244 is connected directly to one input of adder network 254 and to a second input of adder 250 through a 90° phase shifter 256 to create a third rotating vector or Z field in a plane parallel to the plane of coils 210 and 212.

The signals picked up by coils 216 and 218 on the observer's helmet 214 vary continuously in phase with movements of the operator's head. This is illustrated in FIG. 14A wherein the vectors 222 and 224 represent the direction and amplitude of the X field components set up by coil pairs 210–212 and 206–208, respectively. It will be understood that these fields have fixed orientations in space but varying in amplitude. The field from one coil pair varies in a sinusoidal fashion with time while the other field undergoes a cosinusoidal variation. This is brought about by the 90° phase shifter 246 which connects the output of oscillator 240 to the input of adder 248. The resultant field is represented by vector 226. Vector 226 is a constant amplitude vector which rotates at the frequency of the X field.

Waveform 228 in FIG. 14B represents the phase of the signal induced in coil 216 by the rotating X field as the observer looks straight ahead. Waveform 229 represents the phase of the signal indicated in coil 216 if the helmet together with the coil 216 is rotated in azimuth by 45°. It can be shown that the position of the operator's head is uniquely indicated by the phases of the signals picked up by coils 216 and 218. Thus it is possible to amplitude limit the signals picked up by coils 216 and 218 and employ only the phase information present in these signals to control the operation of the servo loop. This is an advantage since the phase information provided by the signals is not subject to distortion due to changes in gain of the amplifiers or changes in the output level of the oscillators in the servo system.

Figure 15:
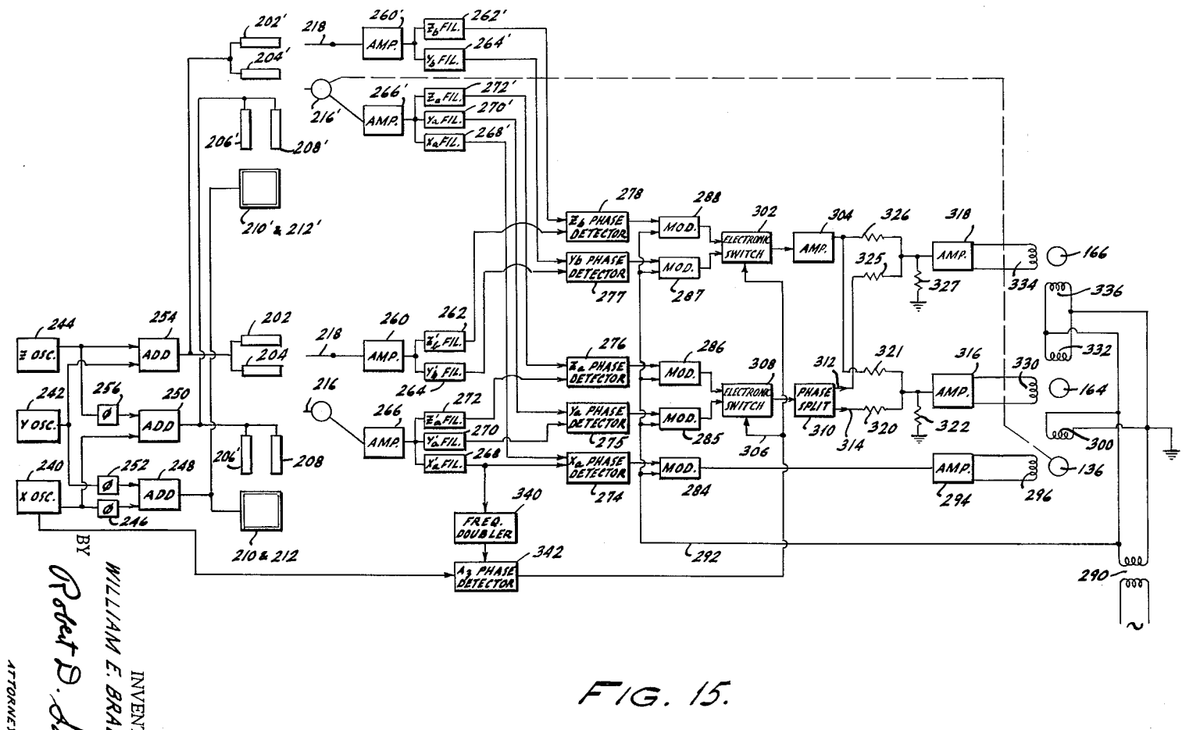
FIG. 15 is a detailed block diagram of a pickup control servo system which may employ the observer position sensing means shown in FIGS. 12–14 and the pickup control means shown in FIGS. 8–11.

FIG. 15 is a diagram partly in schematic form and partly in block form of the control portion of a remote viewing system which employs the observer sensing means of FIGS. 12–14 and the pickup positioning means of FIGS. 8–11. The video and sweep circuits are not shown since they may follow conventional closed circuit television practice. Parts in FIG. 15 corresponding to like parts in FIGS. 8–14 are identified by the same reference numerals.

The system of FIG. 15 is a closed loop servo system. Therefore it is necessary to sense the position of the pickup as well as the position of the observer's head. This is accomplished in precisely the same manner that the position of the observer's head is determined, that is, by setting up three rotating magnetic fields about the pickup and providing two sensing coils mounted on the camera tube corresponding to coils 216 and 218 on the helmet of the observer. In FIG. 15 the means for setting up the reference field is represented by coils 202', 204', 206', 210' and 212'. As shown, coil 202' is connected in shunt with coil 202 and similary for the other coils. The two sensing coils on the pickup are identified by the numbers 216' and 218', respectively. In general, the servo loop system diagrammed in FIG. 15 compares the phase of the signals sensed by coils 216 and 218 with the phases of the signals sensed by coils 216' and 218' and then moves the pickup until the phase difference between the compared signals disappear. In the following description of the embodiment of FIG. 15, signals derived from coils 216 or 216' will be given the subscript $a$ and signals derived from coils 218 or 218' will be given the subscript $b$.

If it is assumed that the operator cannot tilt his head a full 90° left or right, it will be seen that the azimuth direction in which the operator is looking is uniquely determined by the $X_a$ field sensed by coil 216. If the operator is looking directly ahead, that is, directly perpendicular to the plane of coil 210, any nodding motion of the head in a plane parallel to plane 208 is uniquely determined by the phase of the $Y_b$ signal sensed by coil 218. Any tilting motion from side to side is indicated by the phase of the $Z_a$ or $Z_b$ signals sensed in coils 216 and 218, respectively. For reasons which will appear presently, only the $Z_b$ signal sensed by coil 216 is chosen to represent the tilt of the observer's head when looking straight ahead. If the operator turns 90° to the left or right, nod information is represented by the variation in the phase of the $Z_a$ signal sensed by coil 218 and tilt information is indicated by the variations in phase of the $Y_a$ signal in coil 216. Therefore it is necessary to switch the control of the tilt and nod controls of the servo system from the Z and Y fields to the Y and Z fields, respectively, as the operator's head is moved from the forward looking position to the 90° right or left positions. This is most readily accomplished at the 45° points in the manner which will be described presently.

The signals sensed by coil 218 are supplied by way of amplifier 260 to the input of filters 262 and 264. Filter 262 passes signals at the frequency of oscillator 244 and filter 264 passes signals at the frequency of oscillator 242. A signal at the frequency of oscillator 240 may be induced in coil 218. However this signal is not used in the servo loop of FIG. 15 and hence no filter at this frequency is provided at the output of amplifier 260. Coil 216 is connected by way of amplifier 266 to the inputs of three band pass filters 268, 270 and 272. Filters 268, 270 and 272 pass signals at the frequencies of oscillators 240, 242 and 244, respectively. Coils 216' and 218' are connected to an identical amplifier-filter combination. The amplifiers and filters associated with coils 216' and 218' are given primed reference numerals corresponding to the reference numerals of the circuits associated with coils 216 and 218.

Five phase detectors 274–278 are provided for comparing the phase of each signal sensed by coils 216 and 218 and passed by associated filters with a corresponding signal sensed by coils 216' and 218'. That is, phase detector 274 compares the phase of the signal passed by filter 268 with the phase of the signal passed by filter 268', filter 275 compares the phase of the signal passed by filter 270 with the phase of the signal passed by filter 275', etc. Phase detectors 274–278 may be conventional diode phase detectors each of which provides a direct current output signal proportional to the difference in phase of the two signals supplied to the inputs thereof. The legend "$X_a$ phase detector" in block 274 indicates that this phase detector compares the phase of the X signal picked up by coils 216 and 216', respectively. Similarly the legend "$Z_b$ phase detector" in block 78 indicates that this phase detector compares the phase of the Z signal picked up by the coils 218 and 218'. The output signals of phase detectors 274–278 are supplied to the control inputs of five modulators 284 to 288, respectively.

Modulators 284–288 are supplied with a common carrier wave from a carrier wave source represented in FIG. 15 by the transformer 290. The primary of transformer 290 may be energized from a convenient source of alternating current, for example a source of 400 cycle power. In FIG. 15, a connection 292 is made from the input of each of the modulators 284–288 to the secondary of transformer 290. The output signal of each of the modulators 284–288 will be a 400 cycle signal which will vary in amplitude with the variations in amplitude of the signal supplied by the corresponding phase detector and reverse in phase when the output of the corresponding phase detector reverses polarity.

The output of modulator 284 is supplied by way of amplifier 294 to one field winding 296 of two phase azimuth motor 136. Motor 136 corresponds to the similarly numbered motor of FIG. 8. The second field winding 300 of motor 136 is energized from the secondary of transformer 290. Thus motor 136 will rotate in a direction and at a speed determined by the direction and magnitude of the phase error sensed by detector 274.

The output signals of modulators 287 and 288 are supplied to the two inputs of an electronic switch 302. Electronic switch 302 is so constructed that one or the other of the signals supplied to the inputs thereof is passed to amplifier 304 depending upon the signals supplied to control input 306. Various forms of electronic switches for accomplishing this purpose are well known in the art. For example, switch 302 may comprise two pentode amplifier tubes having a common anode load impedance with the signals from modulator 287 supplied to the control grid of one tube and the signal from modulator 288 supplied to the control grid of the other tube. A push-pull signal may be supplied by way of connection 306 to the suppressor grids of the two tubes so that when one tube is permitted to conduct the other tube is cut off and vice versa. The output of the circuit is taken from the common anode load impedance.

In a similar fashion, the outputs of modulators 285 and 286 are supplied by way of electronic switch 308 to the input of a phase splitting amplifier 310. Amplifier 310 provides two signals of approximately equal amplitude but opposite phase at output connections 312 and 314, respectively. The output circuits of amplifier 304 and phase splitter 310 are connected to the inputs of two power amplifiers 316 and 318 by way of two resistive adder networks which comprise resistors 320, 321 and 322 and resistors 325, 326 and 327, respectively. Resistors 320, 321, 325 and 326 are isolating resistors and have values large compared to resistors 322 and 327. The output of amplifier 316 is connected to one field coil 330 of motor 164. Again motor 164 corresponds to the similarly numbered motor in FIG. 8. A second field coil 332 is energized from the secondary of transformer winding 290. Similarly one field winding 334 of motor 166 is connected to the output of amplifier 318 and the second field winding 336 is connected to the secondary of transformer 290.

It will be seen that the output of electronic switch 302 is applied equally to the field coils 330 and 334 of motors 164 and 166 and therefore will cause these two motors to rotate in the same direction. As explained above, rotation of motors 164 and 166 in the same direction will cause the pickup to tilt about the axis of shafts 148 and 149. Thus the signal provided by switch 302 controls the nodding of the pickup in the front-to-back plane.

It will also be seen from FIG. 15 that the output of electronic switch 308 is applied in opposite phase to the two motors 164 and 166 thus causing these motors to rotate in opposite directions to control the tilt of the pickup or its rotation about the axis of the inner ring 156 in FIG. 8. If a signal is present both at the output of electronic switch 302 and at the output of electronic switch 308, motors 164 and 166 will in general run at different speeds and in the same or in opposite directions depending upon the magnitudes of the signals supplied by switches 302 and 308, respectively.

It will be seen that, in each instance, the signal supplied by switch 308 is derived from a signal sensed by coil 218. However in one instance it is the Y signal and in the other case it is the Z signal. Similarly the output of switch 302 is always derived from a signal sensed by coil 216. Switches 302 and 308 are so arranged that when the $Y_a$ signal is passed by switch 308, the $Z_b$ signal is passed by switch 302. Similarly when the $Z_a$ signal is passed by switch 308, the $Y_b$ signal is passed by switch 302. This transition is made at approximately the 45° azimuth position for the reason mentioned above, namely, that with the observer looking straight ahead, the nod signal is determined by the phase of the Y field in coil 218 and, at the 90° and 270° azimuth positions, the degree of nod of the observer's head is indicated by the phase of the Z field in coil 218.

The necessary switching signal for electronic switches 302 and 308 is provided by means of a frequency doubler 340 and phase detector 342. Frequency doubler 340 provides a signal at twice the frequency of the $X_a$ signal passed by filter 268 to one input of phase detector 342. A signal at reference phase from the oscillator 240 is supplied to the second input of phase detector 342. Thus the output of phase detector 342 will change polarity at the ±450° azimuth positions. The output signal from phase detector 342 is supplied by way of connection 306 to the inputs of switches 302 and 308, respectively.

Figure 16:
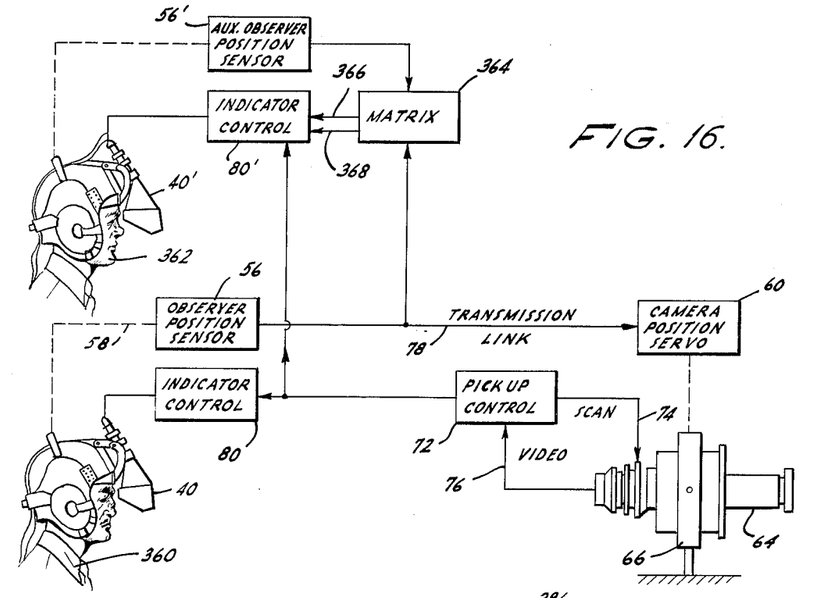
FIG. 16 is a diagram of an embodiment of the invention employing two indicators one of which is controlled jointly by the principal observer and an associate observer.

FIG. 16 illustrates an embodiment of the invention in which principal observer 360 and an associate observer 362 both view a scene selected by the principal observer 360. The portion of the system associated with the principal observer and the remote pickup may be identical to the system shown in FIG. 1. Therefore like parts have been identified by the same reference numerals. The auxiliary observer 362 is provided with an indicator system 40' which may be identical to the indicator 40. The auxiliary position sensor 56' may be identical to the observer position sensor 56. It may be of the position sensing means shown in FIGS. 4 through 6 or the position sensing system shown in FIGS. 12 and 13. Indicator control 80' may be identical to indicator control 80 but must include means for positioning or decentering the raster on the cathode ray tube both horizontally and vertically. Such controls are normally included in cathode ray tube circuits. The matrix 364 compares the information provided by the observer positioned sensor 56 with the information provided by auxiliary observer position sensor 56' and supplies to indicator control 80' horizontal and vertical position voltages by way of connections 366 and 368, respectively.

Figure 16A:
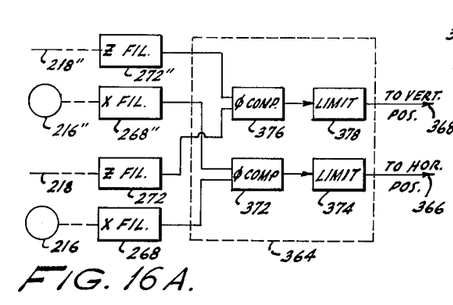
FIG. 16A is a detailed block diagram of the matrix unit and associated circuitry of FIG. 16.

FIG. 16A is a block diagram of portions of the observer position sensor 56, auxiliary observer position sensor 56' and matrix 364. Coils 216 and 218 and filters 268 and 272 correspond to similarly numbered elements in FIG. 15. Amplifiers 260 and 266 have been omitted from FIG. 16A in order to simplify the drawing. Coils 216'' and 218'' and filters 268'' and 272'' are included in the auxiliary observer position sensor 56' and perform the same function as their counterparts in observer position sensor 56. Filters 268 and 268'' are connected to the two inputs of a phase comparator 372. Since the phase of the signal provided by filter 268 represents the azimuth of the observer's head and the output signal of filter 268'' represents the azimuth of the auxiliary observer's head, the output of phase comparator 372 will be indicative of the difference in azimuth between the principal observer's head and the auxilitry observer's head. The output of phase comparator 372 is connected by way of limiter 374 and connection 366 to the horizontal position control in the indicator control 80'. This signal acts as a decentering control. The image provided by auxiliary indicator 40' will be displaced to the right or to the left of the screen in a direction and by an amount which is indicative of azimuthal difference between the apparent line of sight of the principal observer and the apparent line of sight of the auxiliary observer. It should be understood that the actual physical positions of the two observers is unimportant. What is compared are the positions of the two observers with respect to the arbitrary frames of reference established by the position sensors 56 and 56'. Limiter 374 is provided to ensure that the image on indicator 40' will not be moved entirely off the observer's screen.

The outputs of filters 272 and 272'' are compared in a phase comparator 376 and the error signal resulting from this comparison supplied to the vertical position control by way of limiter 378 and connection 368. Since the phases of the signals passed by filter 272 and 272'' are indicative of the nod angle of the observer's head and the auxiliary observer's head, respectively, the image seen by the auxiliary observer will be displaced in a vertical direction by an amount and in a direction proportional to the difference in the inclination of the two lines of sight.

Figure 17:
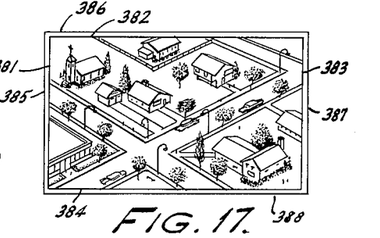
FIGS. 17–19 are representations of views which may appear on the auxiliary indicator of FIG. 16.

FIG. 17 represents a view which may appear on the screen of the principal observer 360 and also on the screen of the auxiliary observer 362 if he is looking in the same direction as the principal observer. It should be noted that the edges 381–384 of the image correspond generally to the edges 385–388 of the screen.

Figure 18:
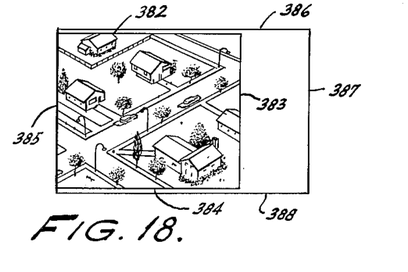

FIG. 18 represents the view seen by the auxiliary observer if he is looking to the right of the principal observer's line of sight. In this instance the top and bottom edges 382 and 384 of the image still correspond generally to the edges 384 and 386 of the screen but edge 383 of the image is displaced to the left of the edge 387 of the screen. Edge 381 of the image has been moved off the screen.

Figure 19:
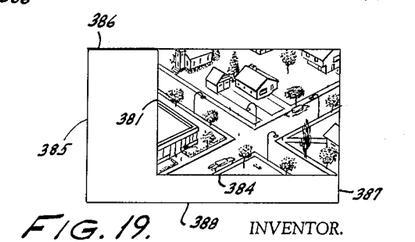

FIG. 19 is a view similar to FIG. 18 except that the auxiliary observer is looking to the left and below the line of sight of the principal observer. In this instance edge 381 of the image is to the right of edge 385 of the screen and edge 384 of the image is above the edge 388 of the screen.

In most instances it will not be necessary to provide correction for differences in the angle of tilt of the two indicators 40 and 40'. However, if it is desirable to make such a correction, it may be accomplished as follows. The $Y_a$ signal provided by filter 264 is compared with the output of a similar filter (not shown) in the auxiliary observer position sensor 56' and the error signal provided thereby used to rotate the deflection yoke of the indicator 40'. This causes the image seen by the auxiliary observer to tilt. The auxiliary observer may collimate his line of sight with that of the principal observer by moving his head until the image seen by him exactly fills the screen of indiactor 40'. The center of the screen and the center of the image may be provided with suitable reference indicia to facilitate exact collimation of the two lines of sight if this is necessary.

Additional features and adavntages of the invention are that the principal scene and the instruments may be presented at controllable brightness levels thereby eliminating the need for changes in the dark adaptation of the eye of the observer. Also the television system may be provided with suitable signal amplitude limiters to protect the observer from bright flashes such as sun glint and flash bombs. Use may also be made of infra red image converters and sensitive pickup tubes to increase the detail presented at night. The small size of the cathode ray tube makes the use of a field sequential color television system with a rotating color wheel entirely practical. Also field sequential stereoscopic vision is possible if alternate fields are switched to the right and left eye by means of rotating shutter. All of these applications would preferably employ wide angular field optical systems.

While the invention has been described with reference to the preferred embodiments thereof, it will be apparent that various modifications and other embodiments thereof will occur to those skilled in the art within the scope of the invention. Accordingly I desire the scope of my invention to be limited only by the appended claims.

I claim:

1. A remote controlled remote viewing system comprising a headpiece adapted to be worn on the head of an observer, an image forming means secured to and movable with said headpiece, said image forming means being supported in a position to cause the image formed thereby to occupy substantially the entire field of view of said observer when said headpiece is positioned on the head of an observer, the combination of said headpiece and said image forming means permitting substantially unrestricted movement of the head of the observer relative to the trunk of said observer, means establishing a fixed frame of reference directions, position sensing means coupled to said last mentioned means and said headpiece for sensing the angular position of said headpiece relative to said reference directions, said position sensing means being substantially non-responsive to linear displacements of said headpiece, a remote image pickup means, means coupled to said position sensing means and said remote image pickup means for orienting said remote image pickup means in accordance with the angular position of said headpiece relative to said reference directions, and means coupling said pickup means to said image forming means to cause an image sensed by said remote image pickup to be displayed by said image forming means.

2. A remote controlled remote viewing system in accordance with claim 1 wherein said image forming means is supported substantially entirely by said headpiece and is positioned so as to be closer to the eyes of an observer wearing said headpiece than the normal near point of the observer's vision.

3. A remote controlled remote viewing system in accordance with claim 1 wherein said headpiece is mechanically coupled to said means establishing a fixed frame of reference directions, said mechanical coupling means being constructed to permit relatively unrestricted movement of said headpiece within a preselected volume of space relative to said means establishing said fixed frame of reference directions.

References Cited by the Examiner

UNITED STATES PATENTS

| | | | |
|---|---|---|---|
| 1,939,665 | 12/33 | Crew | 178—7.14 |
| 2,312,954 | 3/43 | Bown | 178—7.2 |
| 2,711,594 | 6/55 | Hickey | 35—12 |
| 2,955,156 | 10/60 | Heilig | 178—6.5 |
| 3,059,519 | 10/62 | Stanton | 178—7.85 |

FOREIGN PATENTS 1,243,787    9/60    France.

DAVID G. REDINBAUGH, *Primary Examiner.*

E. JAMES SAX, *Examiner.*